United States Patent
Sheldon et al.

(10) Patent No.: US 11,632,450 B1
(45) Date of Patent: Apr. 18, 2023

(54) SLIT APERTURE IMAGE CAPTURING DEVICE WITH DEPTH OF FIELD COMPENSATION

(71) Applicant: MOTOROLA MOBILITY LLC, Wilmington, DE (US)

(72) Inventors: Cole P Sheldon, Chicago, IL (US); Zetong Gu, Chicago, IL (US); John Pincenti, Chicago, IL (US); Emily Yang, Chicago, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 17/677,325

(22) Filed: Feb. 22, 2022

(51) Int. Cl.
*H04N 5/225* (2006.01)
*H04M 1/02* (2006.01)
*H04N 23/55* (2023.01)

(52) U.S. Cl.
CPC .......... *H04M 1/0264* (2013.01); *H04N 23/55* (2023.01)

(58) Field of Classification Search
CPC .................................................. H04M 1/0264
See application file for complete search history.

(56) References Cited

U.S. PATENT DOCUMENTS

2016/0202190 A1* 7/2016 Hein ................ G01N 21/8483
422/69

* cited by examiner

*Primary Examiner* — Gary C Vieaux
(74) *Attorney, Agent, or Firm* — Isidore PLLC (57) ABSTRACT

An electronic device, method and computer program product provide an image capturing device having a lens assembly including a lens and lens housing that supports the lens. The lens housing has an opening that exposes the lens. A planar exterior surface of the electronic device extends across the lens assembly and includes a slit aperture that is smaller than the opening in the lens housing of the image capturing device. The slit aperture directs only a corresponding portion of light from in front of the planar exterior surface through the opening to the lens. The slit aperture enables at least one of: (i) reducing noticeability of the image capturing device; and (ii) use of an adjacent portion of the planar exterior surface for an aesthetic or functional component. An image from the image capturing device is sharpened along a longer dimension of the slit aperture to remove asymmetric blur.

20 Claims, 11 Drawing Sheets

SLIT APERTURE IMAGE CAPTURING DEVICE WITH DEPTH OF FIELD COMPENSATION

BACKGROUND

1. Technical Field

The present disclosure relates generally to electronic devices with image capturing devices, and more particularly to electronic devices with a miniature camera positioned at a display device surface.

2. Description of the Related Art

Many conventional hand-held user electronic devices, such as cellular phones, tablets, and other mobile devices, include miniature camera modules operating as image capturing devices that are positioned at the front and back of the electronic devices. The front surface of a large number of these electronic devices is often almost entirely devoted to a touch screen display. To reduce the overall size of the electronic device, a conventional bezel surface around the touch screen display is made extremely narrow or is removed altogether, which forces the front camera to be placed behind the touch screen display. A circular hole is presented through the functional portions of the conventional display stack for the lens of the front camera. This circular hole is very noticeable and reduces the functional area of the display. To support continued use of a front camera that is less noticeable, some mobile communication devices have the front image capturing device positioned as an under display camera (UDC). Pixels of the touch screen display over the UDC are functionally used to make the UDC less noticeable to avoid a loss in display area. However, the touch screen display affects the performance of the conventional UDC, degrading received images.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

According to a first aspect of the present disclosure, an electronic device incorporates, and a method and a computer program product provide support for an image capturing device having a lens assembly with a lens housed within a housing presenting an opening that directs light from in front of the lens assembly onto at least a portion of the lens. A planar exterior surface of the electronic device extends across the opening of the lens housing. A slit aperture is provided in the planar exterior surface above the opening. The slit aperture has a dimension that is smaller than that of the full opening. The slit aperture directs only a corresponding portion of the light from in front of the planar exterior surface through the opening to the lens. The slit aperture enables at least one of: (i) reducing noticeability of the image capturing device; and (ii) use of an adjacent portion of the planar exterior surface for an aesthetic or functional component.

Incorporating a slit aperture into a display device illustrates the advantages of reducing noticeability and enabling functional use of the adjacent portion of the planar exterior surface. A conventional circular hole for a front side camera is a noticeable interruption in a bezel or display screen of a mobile communication device such as a tablet or smartphone. While an under display camera (UDC) can be fully camouflaged by the display pixels over a camera, the display pixels degrade image quality (IQ). For an UDC, the display pixels block a portion of the light reaching the UDC especially in the blue region, which makes reproducing accurate colors difficult, and poses a difficulty for the auto-white balance (AWB) algorithm to work correctly, because the blue/green ratios are compressed. Since the light passes through the many layers of the display, there will be artifacts such as veiling glare, flare, and diffraction effects.

According to one or more aspects, the slit aperture has reduced noticeability as compared to a circular hole, achieving a substantial amount of camouflaging of the camera. An area devoted to the slit aperture is also substantially less than the area required by a circular hole. This unused area enables aesthetic and functional use, such as enabling additional display pixels to be active above the camera. Light from these active pixels is blocked from below and do not impinge on the camera lens, thus preventing degradation to the IQ of the camera.

The present disclosure further addresses a more fundamental cause of degradation that is related to use of a slit aperture. The slit aperture reduces the amount of light that reaches the underlying image capturing device such as a camera module. In particular, the light has an asymmetric shape. Basic camera principles of aperture size apply as to effects on depth of field and resolution. In particular, asymmetric blurring caused by the narrow dimension of the slit aperture is accounted for and corrected. According to one aspect, the electronic device includes a memory that stores a slit aperture optical compensation (SAOC) application. A controller of the electronic device is communicatively coupled to the image capturing device and to the memory. In one or more embodiments, the electronic device sharpens an image received from the image capturing device in an orthogonal longer dimension of the slit aperture to remove asymmetric blur. In a particular embodiment, the controller executes the SAOC application to: (i) perform a deconvolution algorithm on an image from the image capturing device in a direction of a narrower dimension of the slit aperture to obtain image guide information; and (ii) sharpen the image in an orthogonal longer dimension of the slit aperture using the image guide information to remove asymmetric blur.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

Figure 1:
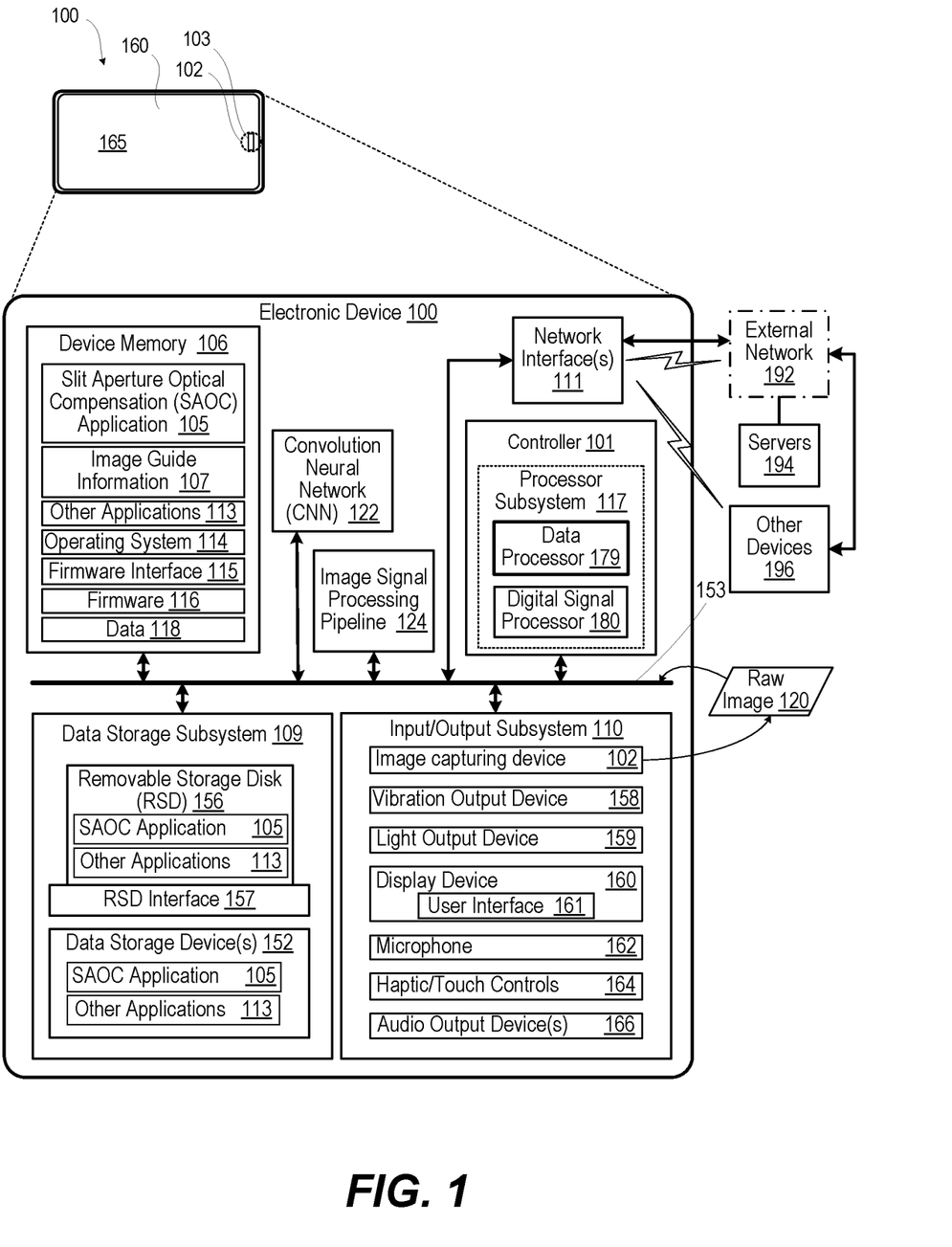
FIG. 1 depicts a functional block diagram of an electronic device having a slit aperture over an image capturing device to reduce noticeability or the image capturing device and enable an aesthetic or functional use of a planar exterior surface over a portion of the image capturing device, according to one or more embodiments.

FIG. 1 is a functional block diagram of electronic device 100 in an operating environment within which the features of the present disclosure are advantageously implemented. In particular, controller 101 of electronic device 100 is communicatively coupled to image capturing device 102, such as a camera module, and to device memory 106. Controller 101 receives images or video from image capturing device 102. Electronic device 100 includes slit aperture 103 in planar exterior surface 104 positioned over image capturing device 102. Slit aperture 103 enables at least one of: (i) reducing noticeability of image capturing device 102; and (ii) use of an adjacent portion of planar exterior surface 104 for an aesthetic or functional component. In one or more embodiments, electronic device 100 includes slit aperture optical compensation (SAOC) application 105 stored in device memory 106. Controller 101 executes SAOC application 105 to: (i) perform a deconvolution algorithm of an image from image capturing device 102 in a direction of a narrower dimension of slit aperture 103 to obtain image guide information; and (ii) sharpen the image in an orthogonal longer dimension of slit aperture 103 using the image guide information to remove asymmetric blur.

Electronic device 100 can be one of a host of different types of devices, including but not limited to, a mobile cellular phone, satellite phone, or smart-phone, a laptop, a net-book, an ultra-book, a networked smart watch or networked sports/exercise watch, and/or a tablet computing device or similar device. Electronic device 100 can be an Internet of Things (IoT) device that may or may not have an external display. With this embodiment, a surveillance camera of the IoT device is camouflaged by a slit aperture.

Figure 2:
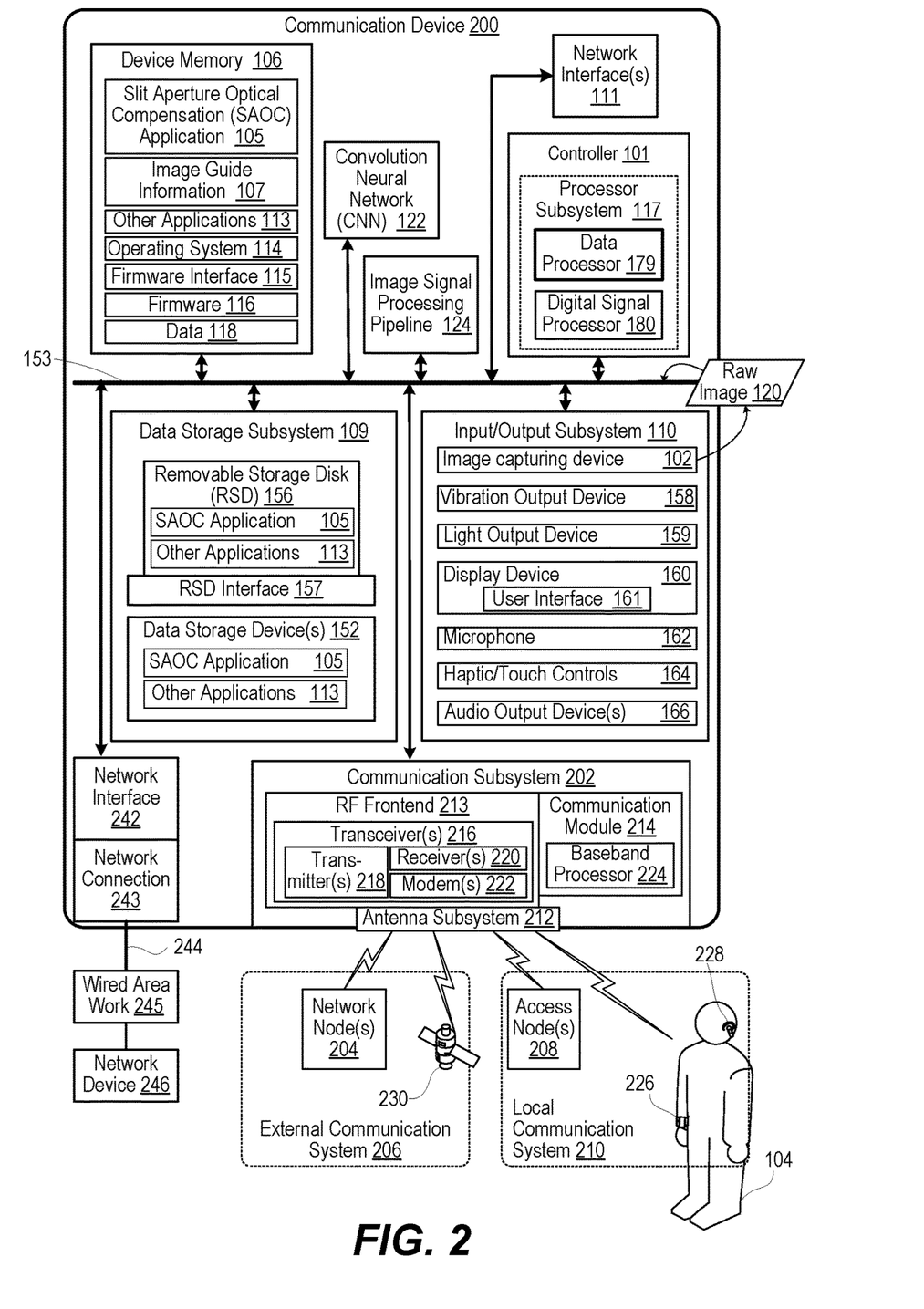
FIG. 2 is a functional block diagram of a communication device in an operating environment within which the features of the present disclosure are advantageously implemented, according to one or more embodiments.

As more completed presented within communication device 200 of FIG. 2, described hereafter, electronic device 100 can also be a device supporting wireless communication. In these implementations, electronic device 100 can be utilized as, and also be referred to as, a system, device, subscriber unit, subscriber station, mobile station (MS), mobile, mobile device, remote station, remote terminal, user terminal, terminal, user agent, user device, a Session Initiation Protocol (SIP) phone, a wireless local loop (WLL) station, a personal digital assistant (PDA), computer workstation, a handheld device having wireless connection capability, a computing device, or other processing devices connected to a wireless modem. Most importantly, it is appreciated that the features described herein can be implemented with a display device of various other types of electronic devices that are not necessarily a communication device. The specific presentation or description herein of a mobile communication device in addition to a data processing system as different examples of electronic device 100 are for example only, and not intended to be limiting on the disclosure.

Referring now to the specific component makeup and the associated functionality of the presented components. In one or more embodiments, electronic device 100 includes device memory 106, data storage subsystem 109, input/output (I/O) subsystem 110, and network interface 111, each of which is managed by controller 101. Device memory 106 includes program code for applications, such as SAOC application 105 and other application(s) 113. Device memory 106 further includes operating system (OS) 114, firmware interface 115, such as basic input/output system (BIOS) or Uniform Extensible Firmware Interface (UEFI), and firmware 116.

Controller 101 includes processor subsystem 117, which executes program code to provide operating functionality of electronic device 100. The software and/or firmware modules have varying functionality when their corresponding program code is executed by processor subsystem 117 or secondary processing devices within electronic device 100. Processor subsystem 117 of controller 101 can execute program code of SAOC application 105 and other application(s) 113 to configure electronic device 100 to perform specific functions. Device memory 106 can include data 118, and in particular image guide information 107 used by SAOC application 105. Slit aperture 103 causes asymmetric blurring in raw image 120. More blurring occurs in raw image 120 in a first direction that corresponds to larger/wide dimension of slit aperture 103. Less blurring occurs in raw image 120 in an orthogonal second direction that corresponds to smaller/narrow dimension of slit aperture 103. Controller 101 executes SAOC application 105 to determine image guide information 107 in the first direction that is less blurred in raw image 120 as compared to the second direction. Controller 101 then uses image guide information 107 to reduce asymmetric blurring of raw image 120 in the orthogonal second direction. In one or more embodiments, SAOC application 105 is augmented by convolution neural network (CNN) 122 and image signal processing pipeline 124, which are discussed further below with regard to FIGS. 4A-4B.

Data storage subsystem 109 of electronic device 100 includes data storage device(s) 152. Controller 101 is communicatively connected, via system interlink 153, to data storage device(s) 152. Data storage subsystem 109 provides applications, program code, and stored data on nonvolatile storage that is accessible by controller 101. For example, data storage subsystem 109 can provide a selection of applications and computer data, such as SAOC application 105 and other application(s) 113. These applications can be loaded into device memory 106 for execution by controller 101. In one or more embodiments, data storage device(s) 152 can include hard disk drives (HDDs), optical disk drives, and/or solid-state drives (SSDs), etc. Data storage subsystem 109 of electronic device 100 can include removable storage device(s) (RSD(s)) 156, which is received in RSD interface 157. Controller 101 is communicatively connected to RSD 156, via system interlink 153 and RSD interface 157. In one or more embodiments, RSD 156 is a non-transitory computer program product or computer readable storage device. Controller 101 can access RSD 156 or data storage device(s) 152 to provision electronic device 100 with program code, such as code for SAOC application 105 and other application(s) 113.

I/O subsystem 110 includes user interface components such as image capturing device 102, vibration output device 158, light output device 159, display device 160 that presents user interface 161 on display screen 165, microphone 162, touch/haptic controls 164, and audio output device(s) 166. Display device 160 is communicatively coupled to controller 101 and presents a user interface and/or operates as a user interface device.

Controller 101 manages, and in some instances directly controls, the various functions and/or operations of electronic device 100. These functions and/or operations include, but are not limited to including, application data processing, communication with second communication devices, navigation tasks, image processing, and signal processing. In one or more alternate embodiments, electronic device 100 may use hardware component equivalents for application data processing and signal processing. For example, electronic device 100 may use special purpose hardware, dedicated processors, general purpose computers, microprocessor-based computers, micro-controllers, optical computers, analog computers, dedicated processors and/or dedicated hard-wired logic.

Controller 101 includes processor subsystem 117, which includes one or more central processing units (CPUs), depicted as data processor 179. Processor subsystem 117 can include one or more digital signal processors 180 that are integrated with data processor 179. Processor subsystem 117 can include other processors that are communicatively coupled internally or externally to data processor 179. Data processor 179 is communicatively coupled, via system interlink 153, to device memory 106, data storage subsystem 109, and network interface 111. Network interface 111 enables electronic device 100 to connect (via wireless or wired connection) to external network 192 and directly/indirectly to other devices 196. Network 192 provides connection to and can include one or more network servers 194 and can provide connection to other devices 196. Electronic device 100 is thus able to connect with servers 194 and other devices 196 to share and/or download application data that can be utilized to implement features of the disclosure. System interlink 153 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (system interlink 153 are illustrated in FIG. 1, it is to be understood that more, fewer, or different interconnections may be present in other embodiments.

FIG. 2 is a functional block diagram of communication device 200 in an operating environment within which the features of the present disclosure are advantageously implemented. Communication device 200 is an implementation of electronic device 100 (FIG. 1) that further includes communication subsystem 202 for communicating using a cellular connection with network node(s) 204 of external communication system 206 and for communicating using a wireless connection with access node(s) 208 of local communication system 210. Communication subsystem 202 includes antenna subsystem 212. Communication subsystem 202 includes radio frequency (RF) front end 213 and communication module 214. RF front end 213 includes transceiver(s) 216, which includes transmitter(s) 218 and receiver(s) 220. RF front end 213 further includes modem(s) 222. Communication module 214 of communication subsystem 202 includes baseband processor 224 that communicates with controller 101 and RF front end 213. Baseband processor 224 operates in a baseband frequency range to encode data for transmission and decode received data, according to a communication protocol. Modem(s) 222 modulate baseband encoded data from communication module 214 onto a carrier signal to provide a transmit signal that is amplified by transmitter(s) 218. Modem(s) 222 demodulates each signal received from external communication subsystem 202 using by antenna subsystem 212. The received signal is amplified and filtered by receiver(s) 220, which demodulate received encoded data from a received carrier signal.

In one or more embodiments, controller 101, via communication subsystem 202, performs multiple types of cellular OTA or wireless communication with local communication system 210. Communication subsystem 202 can communicate via Bluetooth connection with one or more personal access network (PAN) devices, such as smart watch 226 and wireless headset 228. Communication via Bluetooth connection includes both transmission and reception via a Bluetooth transceiver device. In one or more embodiments, communication subsystem 202 communicates with one or more locally networked devices via a wireless local area network (WLAN) link provided by access node(s) 208. In one or more embodiments, access node(s) 208 supports communication using one or more IEEE 802.11 WLAN protocols. Access node(s) 208 is connected to a wide area network such as the Internet. In one or more embodiments, communication subsystem 202 communicates with GPS satellites 230 to obtain geospatial location information.

In one or more embodiments, communication device 200 includes network interface controller (NIC or "network interface") 242 with a network connection (NC) 243. Network interface 242 can be synonymous with and perform similar functions as network interface 111 (FIG. 1) in some implementations. Network cable 244 connects NC 243 to wired area network 245. NIC 242 can be referred to as a "network interface" that can support one or more network communication protocols. Wired area network 245 can be a local area network (LAN), a campus area network (CAN), a metropolitan area network (MAN), or a wide area network (WAN). For example, NC 243 can be an Ethernet connection. Network device 246 is communicatively coupled to wired area network 245.

Figure 3A:
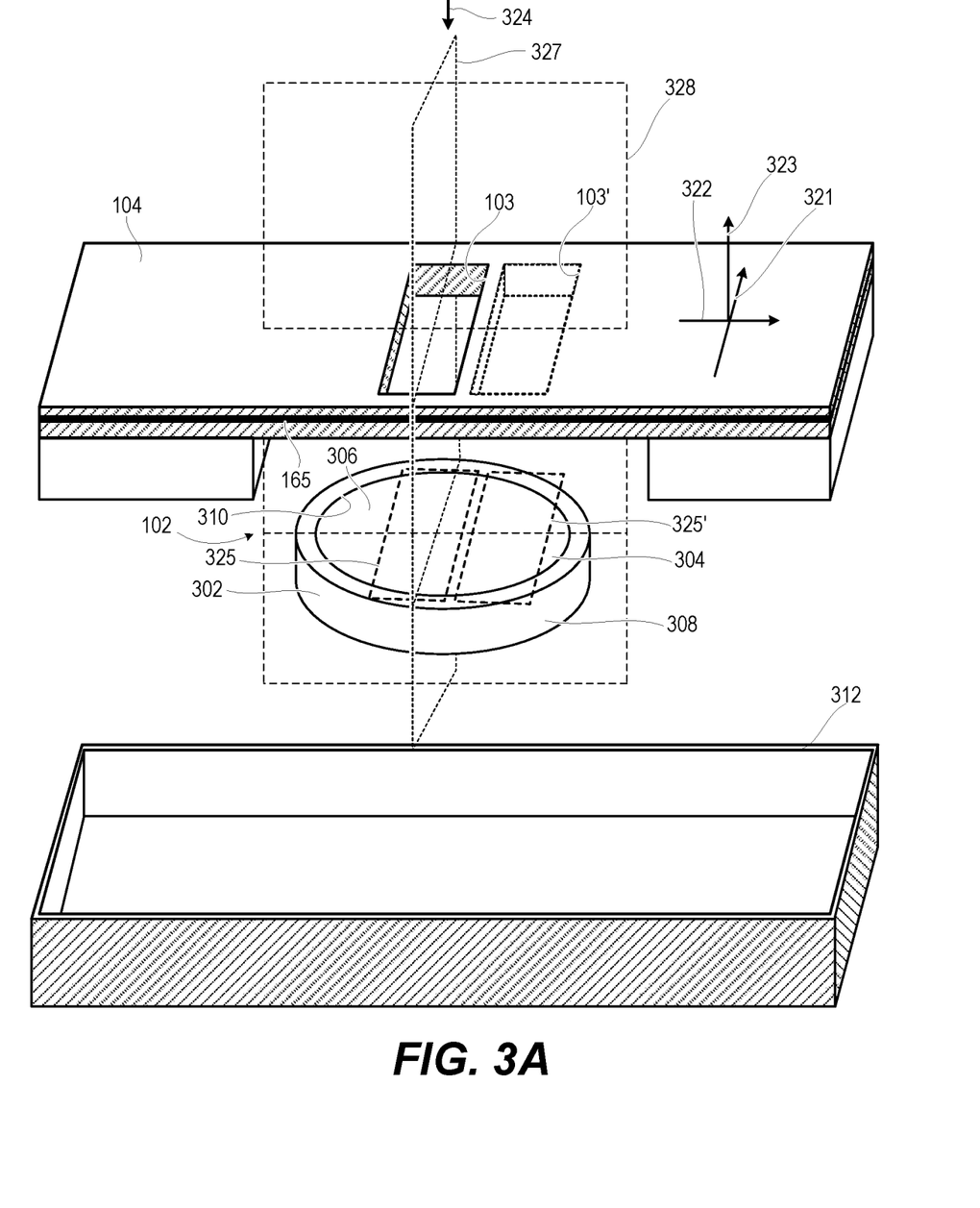
FIG. 3A depicts an exploded three-dimensional view of the planar exterior surface of the device of FIG. 1 or FIG. 2 having the slit aperture over the image capturing device, according to one or more embodiments.

FIG. 3A depicts an exploded three-dimensional view of device 100/200 (FIG. 1/FIG. 2) with planar exterior surface 104 having slit aperture 103 that is centered or slit aperture 103' (depicted in phantom lines) that is offset over image capturing device 102. Image capturing device 102 includes camera module 302 which has lens assembly 304 with lens 306 housed within lens housing 308. Lens housing 308 presents opening 310 that exposes lens 306 and through which lens 306 receives light. In one or more embodiments, lens 306 and opening 310 are circular. Casing 312 encloses image capturing device 102 and includes planar exterior surface 104 that extends across opening 310 of lens housing 308. In one or more embodiments, planar exterior surface 104 is referred to as a front side of either electronic device 100 of FIG. 1 or communication device 200 of FIG. 2. Aspects of the present disclosure may be implemented on any side of a device including devices that do not present a flat surface. Planar exterior surface 104 has (centered) slit aperture 103, or alternatively, (off-set) slit aperture 103'. Slit aperture 103/103' is smaller than opening 310 of lens housing 308. In one or more embodiments, slit aperture 103 or slit aperture 103' are rectangular. In one or more embodiments, slit aperture 103 or slit aperture 103' are a non-rectangular elongate shape such as a rounded rectangle or ellipse. The narrow dimension of slit aperture 103 or slit aperture 103' reduces noticeability of image capturing device 102 and enables use of an adjacent portion of planar exterior surface 104 for an aesthetic or functional component. In one or more embodiments, slit aperture 103 or slit aperture 103' has an aspect ratio of 2.0 or higher.

In an example, display screen 165 and transparent exterior layer 315 of display device 160 (FIG. 1) are incorporated into planar exterior surface 104. In one or more embodiments, lens 306 and planar exterior surface 104 are in parallel surface alignment. First direction 321 is in the plane of planar exterior surface 104 and aligned in parallel with a longer, wider, and/or larger dimension of slit aperture 103 or slit aperture 103'. Second direction 322, which is orthogonal to first direction 321, is in the plane of planar exterior surface 104 and aligned in parallel with a shorter, narrower, and/or smaller dimension of slit aperture 103 or slit aperture 103'. The description of FIGS. 3B-3D utilizes the following convention in defining horizontal and vertical dimensions of slit aperture 103 with respect to the birds' eye view of display screen 165 of electronic device 100 in FIG. 1. When viewing front surface (display screen 165) of electronic device 100 in FIG. 1, first direction 321, which is aligned with the longer dimension of slit aperture 103, is vertical and second direction 322, which is aligned with the shorter dimension of slit aperture 103, is horizontal. With continued reference to FIG. 3A, third direction 323 is orthogonal to both first and second directions 321-322. Light 324 that is directly in front of planar exterior surface 104 and indirectly in front of lens assembly 304 is aligned generally with third direction 323 to be directed by slit aperture 103 or slit aperture 103' through opening 310 onto center portion 325 or offset portion 325' respectively of lens 306. Thus, third direction 323 may also be referred to as depth, as light 324 penetrates into lens 306 of either electronic device 100 of FIG. 1 or communication device 200 of FIG. 2.

Figure 3B:
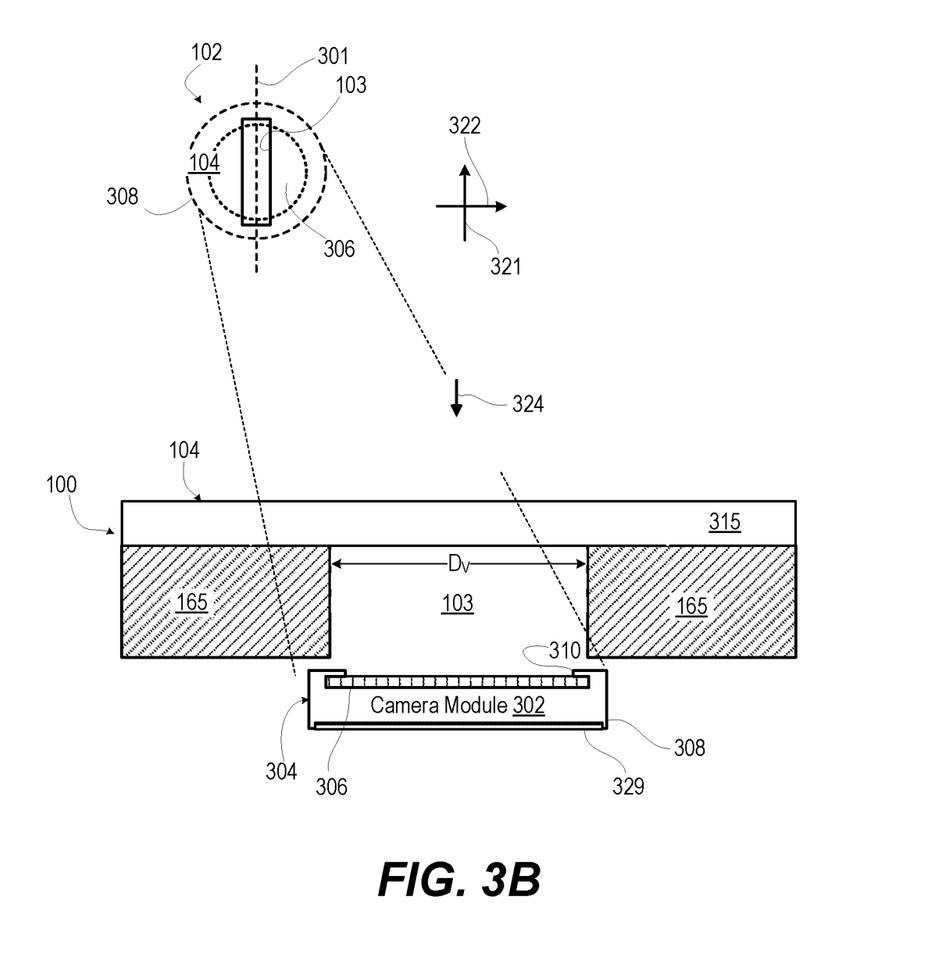
FIG. 3B depicts a side cross sectional view taken vertically through the longer dimension of the rectangular slit aperture that is centered on the aperture of the image capturing device of the devices of FIG. 1 or FIG. 2, according to one or more embodiments.
Figure 3C:
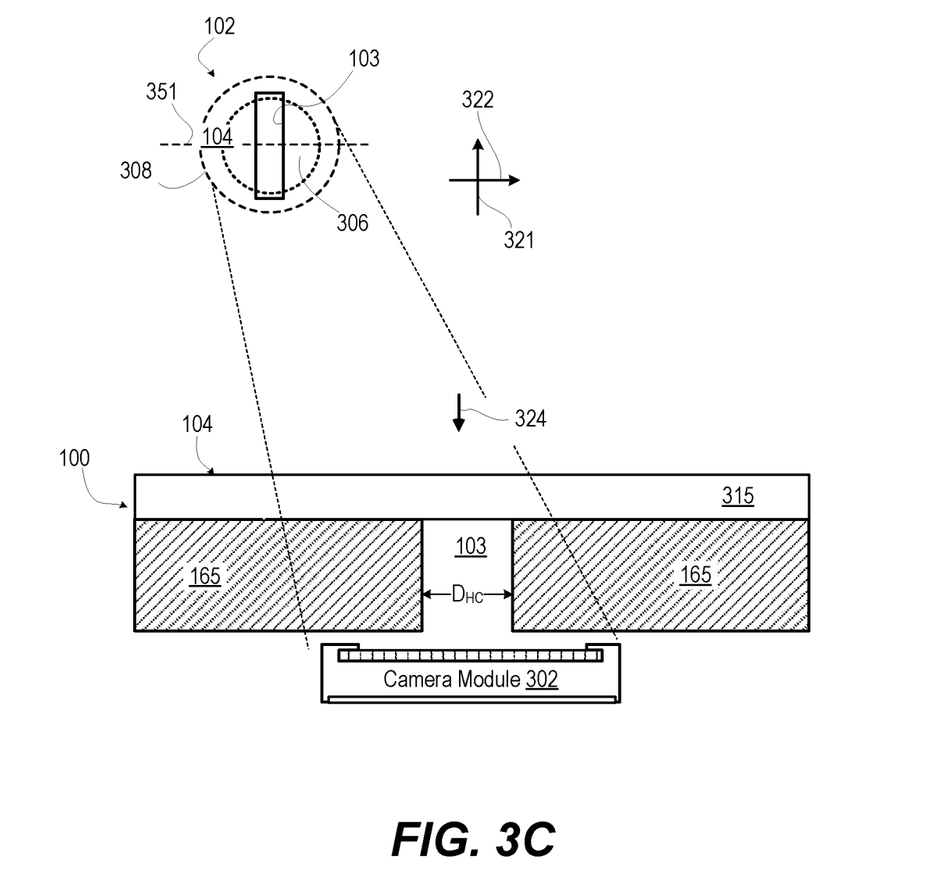
FIG. 3C depicts a side cross sectional view taken vertically through the shorter dimension of the rectangular slit aperture that is centered on the aperture of the image capturing device within the devices of FIG. 1 or FIG. 2, according to one or more embodiments.
Figure 3D:
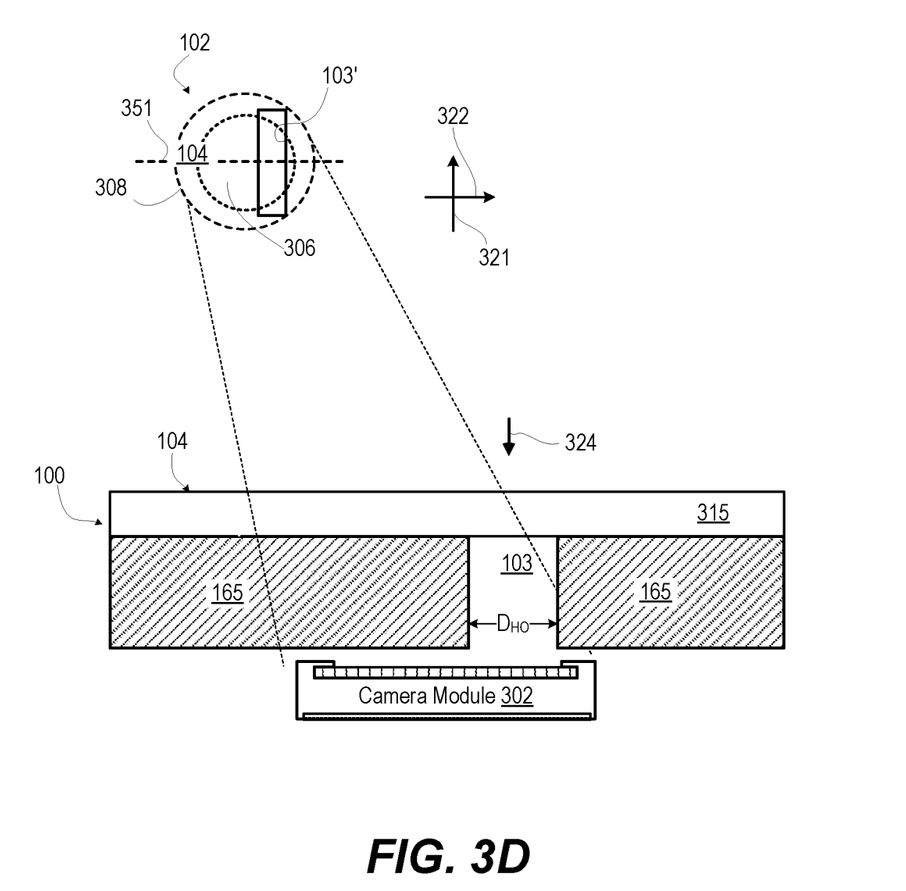
FIG. 3D depicts a top detail view side cross sectional view taken vertically through the shorter dimension of a rectangular slit aperture laterally offset from the center of the aperture of the image capturing device of the device of FIG. 1 or FIG. 2, according to one or more embodiments.

Particular implementations of slit aperture 103 or slit aperture 103' are depicted in FIGS. 3B-3D. In FIG. 3A, first surface annotation 327 is a planar cross sectional reference that is aligned with both the first and third directions 321 and 323, presenting slit aperture 103 in FIG. 3B. A cross section taken through slit aperture 103' would be similar or identical. In FIG. 3A, second surface annotation 328 is a planar cross-sectional reference that is aligned with both the second and third directions 322 and 323, presenting slit aperture 103 in FIG. 3B and slit aperture 103' in FIG. 3D.

FIG. 3B depicts a side cross sectional view taken in first direction 321 ("vertical") along line 301 through a large dimension of slit aperture 103 centered on image capturing device 102 of electronic device 100 (FIG. 1). It is appreciated that communication device 200 (FIG. 2) may include a similar or identical implementation. In one or more embodiments, image capturing device 102 includes camera module 302 having lens assembly 304 and camera controls 329. Lens assembly 304 includes lens housing 308 that supports lens 306. Planar exterior surface 104 of electronic device 100 extends across lens assembly 304. Lens housing 308 has opening 310 that directs light 324 from in front of lens assembly 304 (and especially from in front of planar exterior surface) onto at least a portion of lens 306. Slit aperture 103 is smaller in at least one dimension than opening 310 in lens housing 308 of image capturing device 102. Slit aperture 103 directs only a corresponding portion of light 324 from in front of lens assembly 304 through opening 310 to lens 306. Slit aperture 103 enables at least one of: (i) reducing noticeability of image capturing device 102; and (ii) use of an adjacent portion of planar exterior surface 104 for an aesthetic or functional component. In one or more embodiments, planar exterior surface 104 includes display device 160.

FIG. 3C depicts a side cross sectional view taken in second direction 322 ("horizontally") along line 351 through a small horizontal dimension of slit aperture 103, which is centered on image capturing device 102 of electronic device 100. In this horizontal orientation of slit aperture 103 that is centered, narrow horizontal dimension $D_{HC}$ is smaller than large vertical dimension Dv (FIG. 3B).

FIG. 3D depicts side cross sectional view taken in second direction 322 ("horizontally") along line 351 through a small horizontal dimension of offset slit aperture 103', which is laterally offset on image capturing device 102 of electronic device 100 (FIG. 1) or communication device 200 (FIG. 2). In this horizontal orientation of slit aperture 103' that is laterally offset but has the same dimensions, small dimension $D_{HO}$ is the same size of dimension $D_{HC}$ (FIG. 3C) but laterally offset.

Figure 4A:
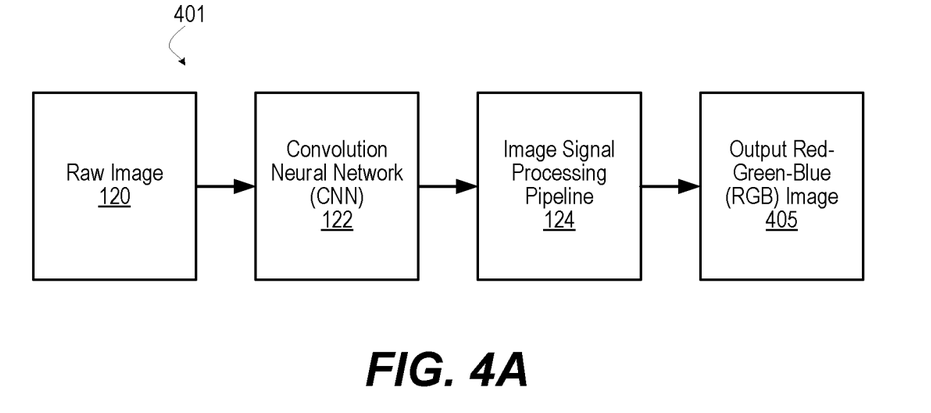
FIG. 4A depicts an example image processing flow diagram including preprocessing by a convolution neural network (CNN) prior to an image signal processing pipeline of the respective device of FIG. 1 or FIG. 2, according to one or more embodiments.
Figure 4B:
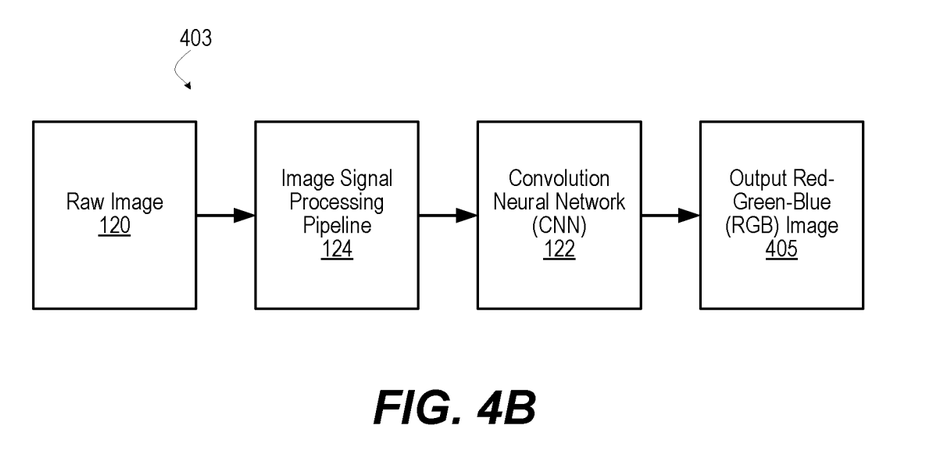
FIG. 4B depicts an alternative image processing flow diagram including postprocessing by the CNN subsequent to an image signal processing pipeline, according to one or more embodiments.

FIG. 4A depicts example image processing flow diagram 401 including preprocessing by CNN 122 prior to image signal processing pipeline 124 of electronic device 100 (FIG. 1) or communication device 200 (FIG. 2). FIG. 4B depicts an alternative image processing flow diagram 403 including postprocessing by CNN 122 subsequent to image signal processing pipeline 124. Raw image 120 is processed by CNN 122 and image signal processing pipeline 124 to produce output red-green-blue (RGB) image 405. Image signal processing pipeline 124 performs optical processing such as black level subtract, lens shading correction, demosaic, white balance, color correction, gamma, and noise reduction. CNN 122 enhances raw image 120 by recovering details which have been blurred due to the presence of slit aperture 103 (FIG. 1). The recovery process may include deconvolution or sharpening. The amount and direction of the blur will depend on the focal position of the lens and the distance to the object being imaged. In focus objects will have blur caused by diffraction effects due to the slit aperture 103 (FIG. 1) and will be dominant along the smaller dimension of the slit aperture 103 (FIG. 1). Out of focus objects will have blur caused by a projection of the aperture and will be dominant along the larger direction of the slit aperture 103 (FIG. 1).

Figure 5:
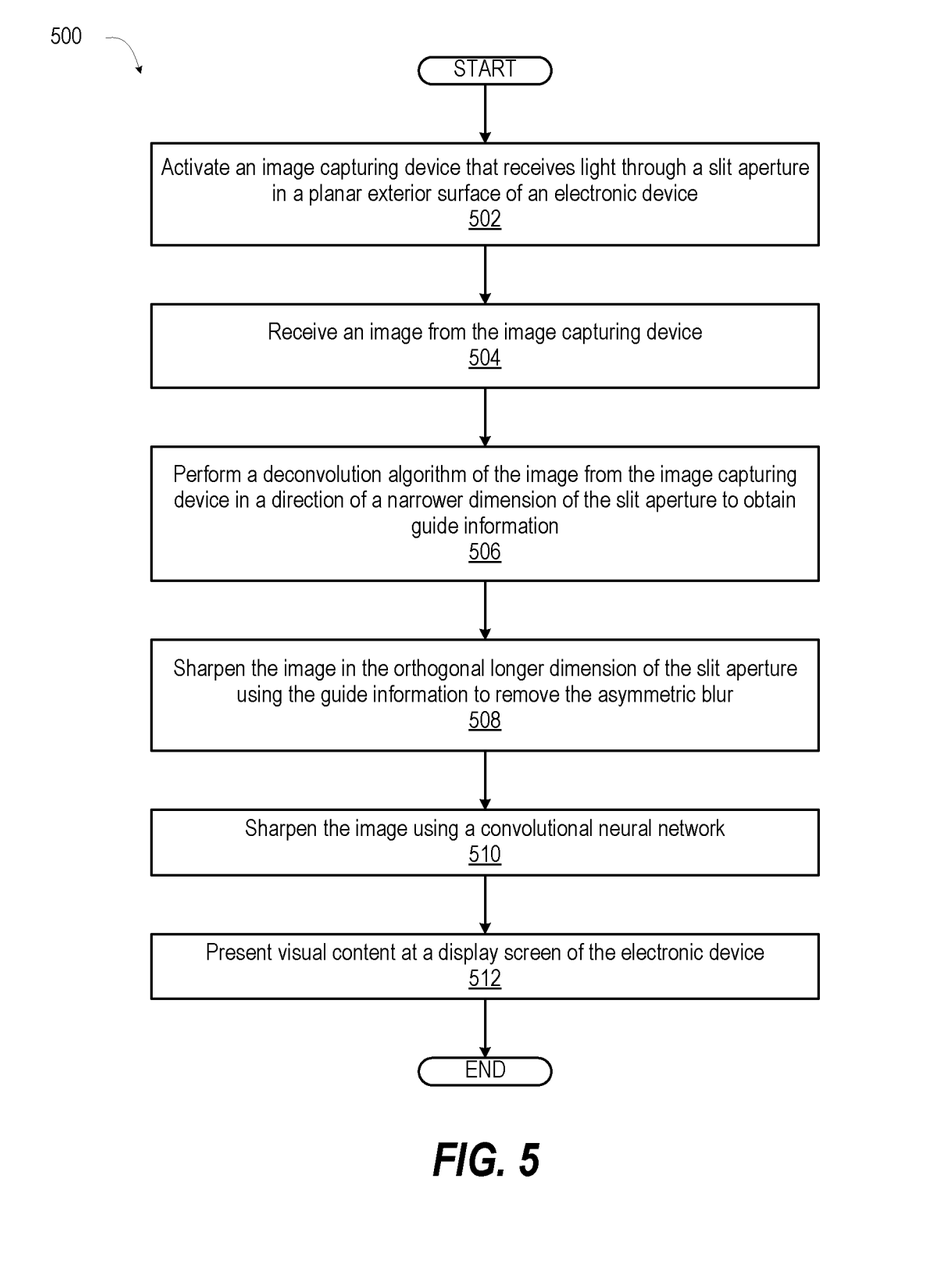
FIG. 5 presents a flow diagram of a method by which an electronic/communication device sharpens an image having asymmetric blurring due to a slit aperture, according to one or more embodiments.

FIG. 5 presents a flow diagram of method 500 performed by electronic device 100 (FIG. 1) or communication device 200 (FIG. 2) for sharpening an image having asymmetric blurring due to a slit aperture. The descriptions of method 500 is provided with general reference to the specific components illustrated within the preceding FIGS. 1-4, and specific components referenced in method 500 may be identical or similar to components of the same name used in describing preceding FIGS. 1-4. In one or more embodiments, controller 101 configures electronic device 100 (FIG. 1) or communication device (FIG. 2) to provide functionality of method 500. With reference to FIG. 5, method 500 includes activating an image capturing device that receives light through a slit aperture in a planar exterior surface of an electronic device (block 502). Method 500 includes receiving an image from the image capturing device (block 504). The image capturing device has a lens assembly including a lens and lens housing that supports the lens. The lens housing has an opening that includes a slit aperture which directs light from in front of the lens assembly onto at least a portion of the lens. The planar exterior surface of the electronic device extends across the opening of the lens housing. The slit aperture in the planar exterior surface is smaller than the opening in the lens housing of the image capturing device. The slit aperture directs only a corresponding portion of the light from in front of the lens assembly through the opening to the lens of the image capturing device. The slit aperture enables at least one of: (i) reducing noticeability of the image capturing device; and (ii) use of an adjacent portion of the planar exterior surface for an aesthetic or functional component.

In one or more embodiments, the lens and the opening in the lens housing are substantially round in shape and the slit aperture is rectangular in shape with length and width dimensions that are smaller than a diameter of the opening in the lens housing. In one or more embodiments, the slit aperture is centered on the opening in the lens assembly of the image capturing device. In one or more embodiments, the slit aperture is offset relative to the center of the opening in the lens assembly of the image capturing device. In one or more embodiments, the slit aperture has an aspect ratio of length to width that is at least 2.

Returning to FIG. 5, in one or more embodiments, method 500 includes performing a deconvolution algorithm of the image from the image capturing device in a direction of a narrower dimension of the slit aperture to obtain image guide information (block 506). Method 500 includes sharpening the image orthogonally in the longer dimension of the slit aperture using the image guide information to remove the asymmetric blur (block 508). In one or more embodiment, method 500 includes sharpening the image using a convolutional neural network (block 510). In particular, convolutional neural network sharpens the image orthogonally in the longer dimension of the slit aperture using the image guide information to remove asymmetric blur. The electronic device includes a casing having the planar exterior surface affixed thereto. The planar exterior surface provides the display screen at a front of the electronic device. In one or more embodiments, method 500 includes presenting visual content at a display screen of the electronic device (block 512). Then method 500 ends.

The slit aperture is successful in camouflaging the camera without significant degradation based on empirical analysis to determine optical performance of: (i) a centered slit aperture; and (ii) an offset slit aperture. According to one aspect, slit apertures reduce the apparent size of an opening of an image capturing device such as a conventional miniature camera module. Slit apertures are almost as camouflaged as a conventional UDC and further can be used on devices that do not have a display. In addition to the visual camouflage, optical processing was evaluated for reducing negative impacts to image quality introduced by a centered or offset slit aperture. In an example, the asymmetric depth of field and asymmetric blurring is made symmetric.

Figure 6A:
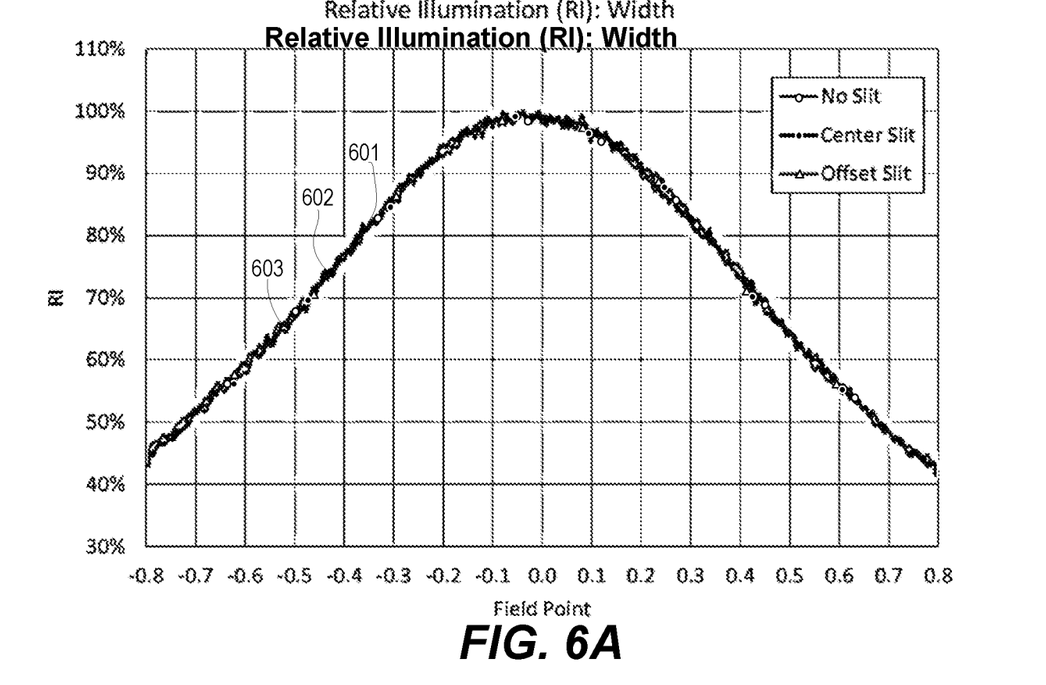
FIG. 6A depicts plots of relative illumination (RI) in width for no slit, center slit, and offset slit implementations as a function of slit aspect ratio, according to one or more embodiments.
Figure 6B:
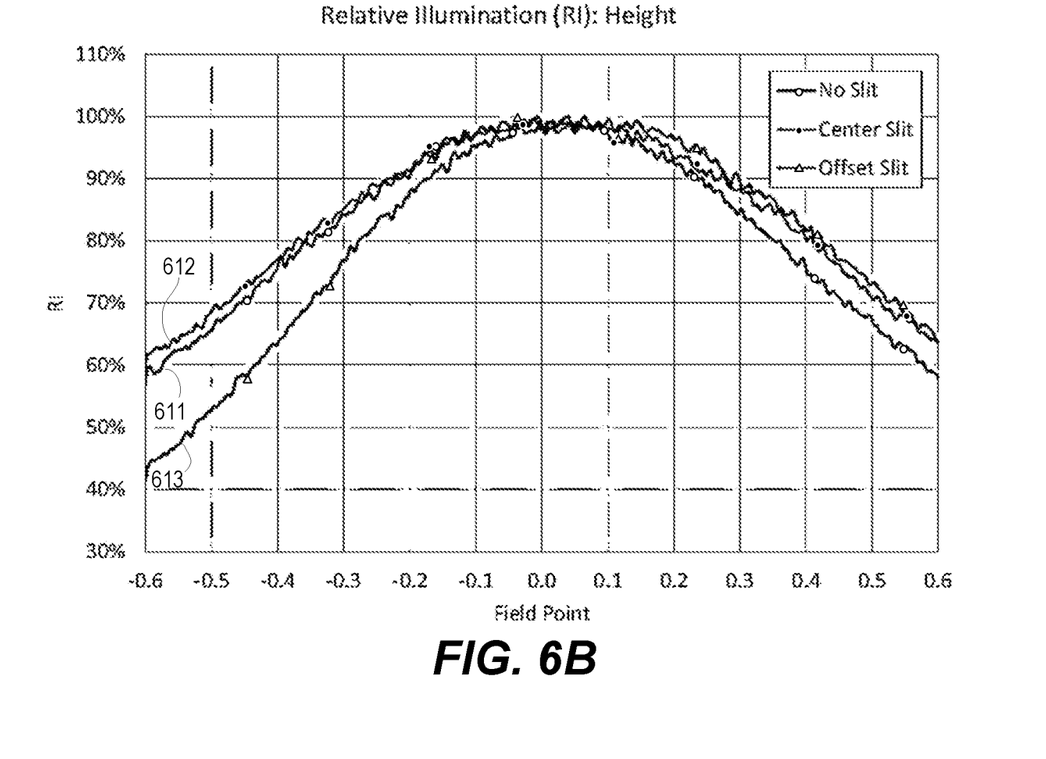
FIG. 6B depicts plots of RI in height for no slit, center slit, and offset slit implementations as a function of slit aspect ratio, according to one or more embodiments.
Figure 6C:
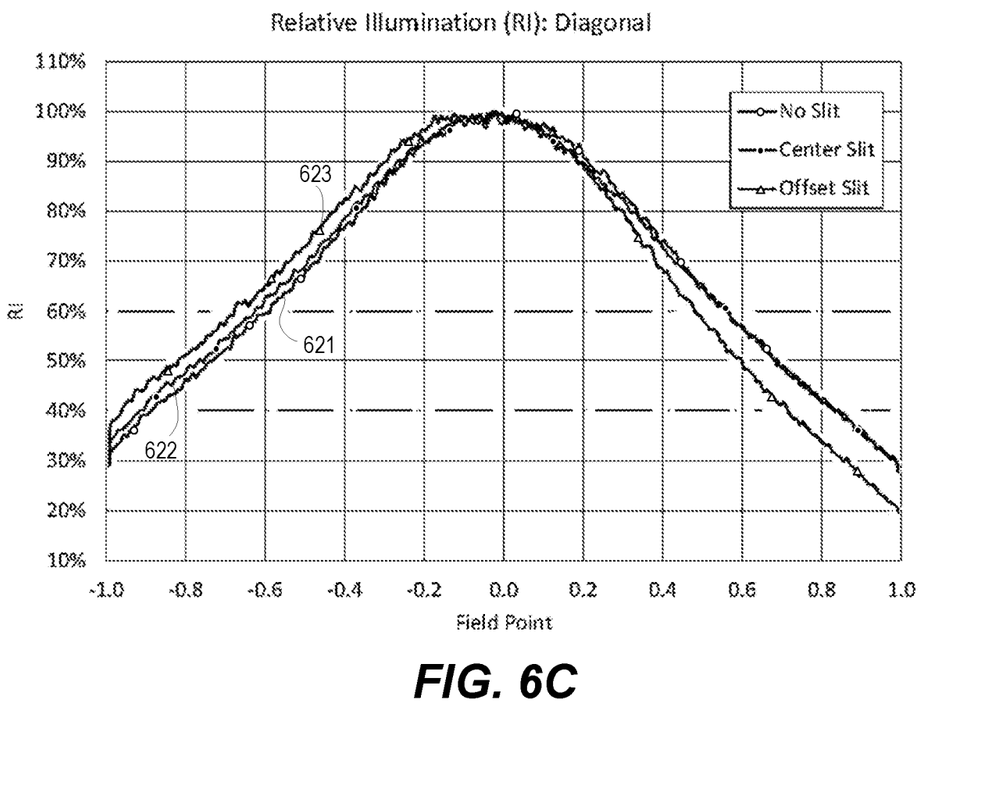
FIG. 6C depicts plots of RI in a diagonal direction for no slit, center slit, and offset slit implementations as a function of slit aspect ratio, according to one or more embodiments.
Figure 7:
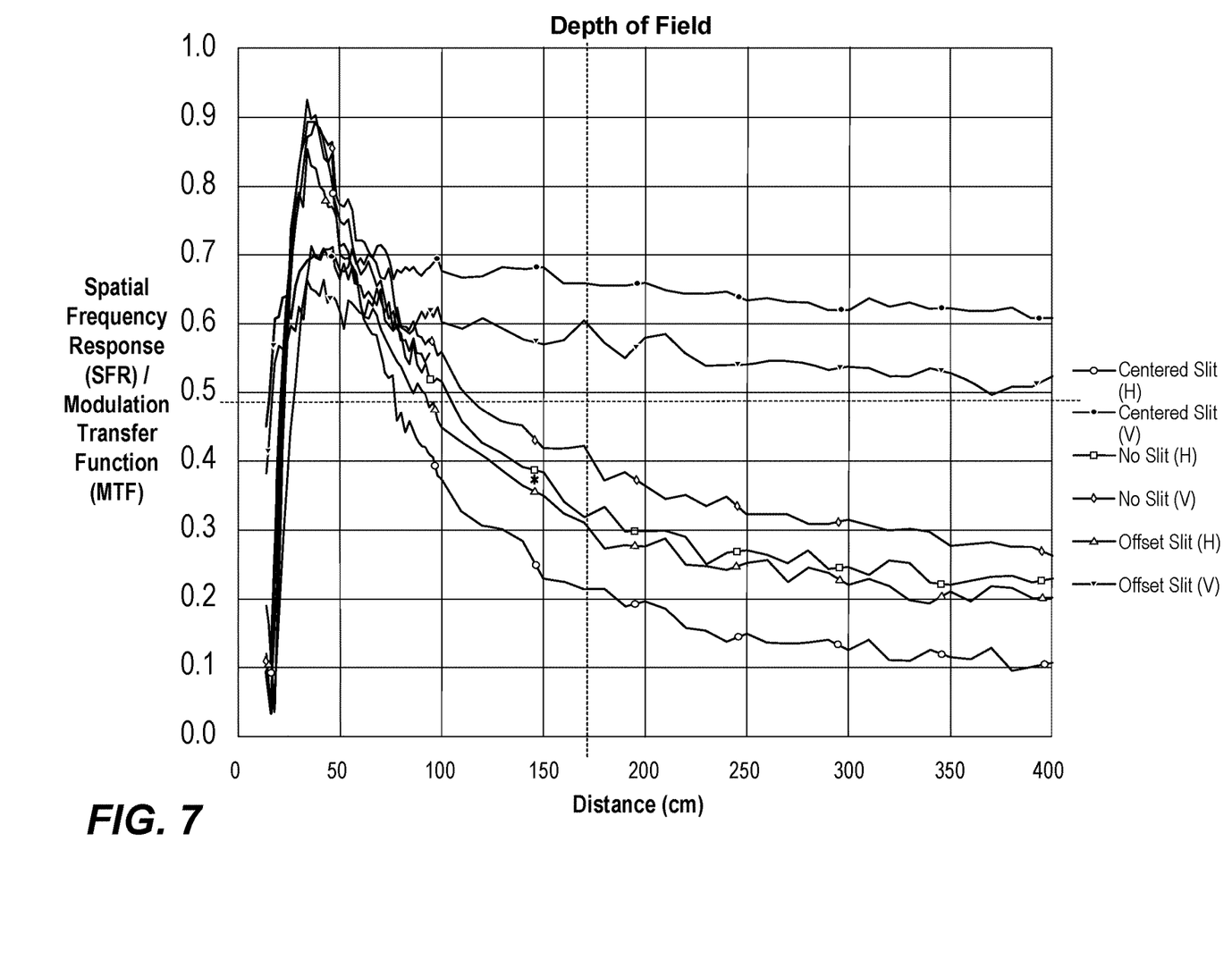
FIG. 7 depicts plots of depth of field as spatial frequency response (SFR)/modulation transfer function (MTF) as a function of distance for horizontal and vertical aspects of centered slit, no slit, and offset slit implementations, according to one or more embodiments.

FIG. 6A depicts plots 601, 602, and 603 of relative illumination (RI) in width respectively for no slit, center slit, and offset slit implementations as a function of slit aspect ratio. FIG. 6B depicts plots 611, 612, and 613 of RI in height for no slit, center slit, and offset slit implementations as a function of slit aspect ratio. FIG. 6C depicts plots 621, 622, and 623 of RI in diagonal for no slit, center slit, and offset slit implementations as a function of slit aspect ratio. FIG. 7 depicts plots of depth of field as spatial frequency response (SFR)/modulation transfer function (MTF) as a function of distance for horizontal and vertical aspects of centered slit, no slit, and offset slit implementations. As depicted in FIGS. 6A-6C and 7, the present disclosure provides image quality (IQ) that is comparable to a round camera aperture.

The analysis confirms the effects of a narrow aperture on optical performance. A large aperture narrows the depth of field. A narrow aperture widens the depth of field, allowing both near and far objects to be in good focus. A smaller aperture can improve the focus; however, a smaller aperture can also make it worse. A camera lens can be characterized by its impulse response. The impulse response is a measure of how well the lens can focus a point of light to a "spot". Due to the wave nature of light, light is diffracted as it goes through the lens aperture, and this puts a limit on how small a "spot" can be. A bigger aperture gives a smaller "spot", for a sharper image. A smaller aperture gives a bigger "spot", which means more blur. A bigger "spot" means a blurrier image. The slit aperture has a small "spot" in a first dimension and has a large "spot" in an orthogonal second dimension. The small "spot" corresponds to optical performance of a camera that is not camouflaged by a slit aperture since the slit aperture has the same dimension in the corresponding direction. The optical information from the small "spot" is useful in optically post-processing the large "spot" to remove asymmetric blur.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. An electronic device comprising:
    an image capturing device having a lens assembly comprising a lens and lens housing that supports the lens, the lens housing having an opening that exposes the lens; and
    a planar exterior surface that extends across the opening of the lens housing and comprises a slit aperture having a dimension that is smaller than the opening of the lens housing, the slit aperture directs only a corresponding portion of light from in front of the planar exterior surface and the lens assembly through the opening to the lens, the slit aperture enabling at least one of: (i) reducing noticeability of the image capturing device; and (ii) use of an adjacent portion of the planar exterior surface for an aesthetic or functional component.

2. The electronic device of claim 1, wherein the lens and the opening in the lens housing are substantially round in shape and the slit aperture is rectangular in shape with length and width dimensions that are smaller than a diameter of the opening in the lens housing.

3. The electronic device of claim 1, further comprising a casing having the planar exterior surface affixed thereto, the planar exterior surface being a display screen at a front of the electronic device.

4. The electronic device of claim 1, further comprising:
    a memory that stores a slit aperture optical compensation (SAOC) application; and a controller communicatively coupled to the image capturing device and to the memory and which executes the SAOC application to:
  perform a deconvolution algorithm of an image from the image capturing device in a direction of a narrower dimension of the slit aperture to obtain image guide information; and
  sharpen the image in an orthogonal longer dimension of the slit aperture using the image guide information to remove asymmetric blur.

5. The electronic device of claim 1, further comprising a convolutional neural network that sharpens the image orthogonally in a longer dimension of the slit aperture using image guide information to remove asymmetric blur.

6. The electronic device of claim 1, wherein the slit aperture is centered on the opening in the lens assembly of the image capturing device.

7. The electronic device of claim 1, wherein the slit aperture is offset relative to the opening in the lens assembly of the image capturing device.

8. The electronic device of claim 1, wherein the slit aperture has an aspect ratio of length to width that is at least 2.

9. A method comprising:
  receiving an image from an image capturing device of an electronic device, the image capturing device having a lens assembly comprising a lens and lens housing that supports the lens, the lens housing having an opening that directs light from in front of the lens assembly onto at least a portion of the lens, a planar exterior surface of the electronic device extending across the lens assembly and comprising a slit aperture having a dimension that is smaller than the opening in the lens housing of the image capturing device, the slit aperture directing only a corresponding portion of the light from in front of the lens assembly through the opening to the lens of the image capturing device, the slit aperture enabling at least one of: (i) reducing noticeability of the image capturing device; and (ii) use of an adjacent portion of the planar exterior surface for an aesthetic or functional component; and
  sharpening the image in an orthogonal longer dimension of the slit aperture to remove asymmetric blur.

10. The method of claim 9, wherein the lens and the opening in the lens housing are substantially round in shape and the slit aperture is rectangular in shape with length and width dimensions that are smaller than a diameter of the opening in the lens housing.

11. The method of claim 9, wherein:
  the electronic device comprises a casing having the planar exterior surface affixed thereto, the planar exterior surface being a display screen at a front of the electronic device; and
  the method further comprises presenting visual content at the display screen.

12. The method of claim 9, wherein sharpening the image in the orthogonal longer dimension of the slit aperture to remove the asymmetric blur comprises:
  performing a deconvolution algorithm of the image from the image capturing device in a direction of a narrower dimension of the slit aperture to obtain image guide information; and
  sharpening the image in the orthogonal longer dimension of the slit aperture using the image guide information to remove the asymmetric blur.

13. The method of claim 9, wherein sharpening the image in the orthogonal longer dimension of the slit aperture to remove the asymmetric blur comprises sharpening the image using a convolutional neural network.

14. The method of claim 9, wherein the slit aperture is centered on the opening in the lens assembly of the image capturing device.

15. The method of claim 9, wherein the slit aperture is offset relative to the opening in the lens assembly of the image capturing device.

16. The method of claim 9, wherein the slit aperture has an aspect ratio of length to width that is at least 2.

17. A computer program product comprising:
  a computer readable storage device; and
  program code on the computer readable storage device that when executed by a processor associated with an electronic device, the program code enables the electronic device to provide functionality of:
    receiving an image from an image capturing device of the electronic device, the image capturing device having a lens assembly comprising a lens and lens housing that supports the lens, the lens housing having an opening that directs light from in front of the lens assembly onto at least a portion of the lens, a planar exterior surface of the electronic device extending across the lens assembly and comprising a slit aperture that is smaller than the opening in the lens housing of the image capturing device, the slit aperture directing only a corresponding portion of the light from in front of the lens assembly through the opening to the lens of the image capturing device, the slit aperture enabling at least one of: (i) reducing noticeability of the image capturing device; and (ii) use of an adjacent portion of the planar exterior surface for an aesthetic or functional component, and
    sharpening the image in an orthogonal longer dimension of the slit aperture to remove asymmetric blur.

18. The computer program product of claim 17, wherein:
  the lens and the opening in the lens housing are substantially round in shape and the slit aperture is rectangular in shape with length and width dimensions that are smaller than a diameter of the opening in the lens housing;
  the electronic device further comprises a casing having the planar exterior surface affixed thereto, the planar exterior surface being a display screen at a front of the electronic device; and
  the functionality comprises presenting visual content at the display screen.

19. The computer program product of claim 17, wherein the program code enables the electronic device to provide the functionality of sharpening the image in the orthogonal longer dimension of the slit aperture to remove the asymmetric blur by:
  performing a deconvolution algorithm of the image from the image capturing device in a direction of a narrower dimension of the slit aperture to obtain image guide information; and
  sharpening the image in the orthogonal longer dimension of the slit aperture using the image guide information to remove the asymmetric blur.

20. The computer program product of claim 17, wherein the program code enables the electronic device to provide the functionality of sharpening the image in the orthogonal longer dimension of the slit aperture to remove the asymmetric blur by using a convolutional neural network.

* * * * *